United States Patent
Chauhan et al.

(10) Patent No.: US 12,321,424 B2
(45) Date of Patent: Jun. 3, 2025

(54) SYSTEM AND SOLUTION TO OBFUSCATE AND PREVENT THE PATTERN ANALYSIS OF JAVA ARCHIVES

(71) Applicant: Dell Products L.P., Round Rock, TX (US)

(72) Inventors: Surendra Chauhan, Bangalore (IN); Udit Tyagi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 18/099,286

(22) Filed: Jan. 20, 2023

(65) Prior Publication Data

US 2024/0248967 A1    Jul. 25, 2024

(51) Int. Cl.
*G06F 21/14*    (2013.01)
*G06F 8/41*    (2018.01)

(52) U.S. Cl.
CPC ............. *G06F 21/14* (2013.01); *G06F 8/427* (2013.01)

(58) Field of Classification Search
CPC ............. G06F 21/14; G06F 8/427; G06F 8/53
See application file for complete search history.

(56) References Cited

U.S. PATENT DOCUMENTS

| | | | | |
|---|---|---|---|---|
| 6,668,325 | B1 * | 12/2003 | Collberg | G06F 21/14 726/26 |
| 2004/0103404 | A1 * | 5/2004 | Naumovich | G06F 9/4492 717/136 |
| 2007/0234070 | A1 * | 10/2007 | Horning | G06F 21/14 713/190 |
| 2023/0133651 | A1 * | 5/2023 | Wildsmith | G06F 8/34 726/24 |
| 2024/0248967 | A1 * | 7/2024 | Chauhan | G06F 8/53 |

* cited by examiner

*Primary Examiner* — Michael Won
(74) *Attorney, Agent, or Firm* — Krishnendu Gupta; Lesley Leonessa (57) ABSTRACT

Methods, system, and non-transitory processor-readable storage medium for a design obfuscation system are provided herein. An example method includes a design obfuscation system that receives software code to be compiled on a system running a software compiler. The design obfuscation system generates obfuscated code from at least a portion of the software code, where the obfuscated code, when decompiled, avoids identification of design patterns in the software code. The design obfuscation system provides the obfuscated code to the software compiler for compiling, and the software compiler compiles the obfuscated code.

20 Claims, 8 Drawing Sheets

```
public static void main(String args[]) throws IOException {
    ASTParser parser = ASTParser.newParser(AST.JLS3);
    File file = new File("./src/com/ppma/FactoryPatternDemo.java");
    BufferedReader br = new BufferedReader(new FileReader(file));
    String st;
    StringBuffer buffer = new StringBuffer();
    while ((st = br.readLine()) != null) {
        System.out.println(st);
        buffer.append(st).append("\n");
    }
    System.out.println(buffer);
    br.close();
    System.out.println();
    parser.setSource(buffer.toString().toCharArray());
    parser.setKind(ASTParser.K_COMPILATION_UNIT);
    final CompilationUnit cu = (CompilationUnit) parser.createAST(null);

cu.accept(new ASTVisitor() {

Set<String> names = new HashSet<>();

public boolean visit(VariableDeclarationFragment node) {
            SimpleName name = node.getName();
            this.names.add(name.getIdentifier());
            System.out
                    .println("Declaration of '" + name + "' at line " + cu.getLineNumber(name.getStartPosition()));
            return false; // do not continue to avoid usage info
        } public boolean visit(SimpleName node) {
            if (this.names.contains(node.getIdentifier())) {
                System.out.println("Usage of '" + node + "' at line " + cu.getLineNumber(node.getStartPosition()));
```

FIG. 3

```
public class FactoryPatternDemo { public static void main(String[] args) {
                ShapeFactory shapeFactory = new ShapeFactory();

Shape shape1 = shapeFactory.getShape("CIRCLE");
                shape1.draw();

Shape shape2 = shapeFactory.getShape("RECTANGLE");
                shape2.draw();

Shape shape3 = shapeFactory.getShape("SQUARE");
                shape3.draw();
        }
}

Declaration of 'shapeFactory' at line 9
Declaration of 'shape1' at line 11
Usage of 'shape1' at line 12
Declaration of 'shape2' at line 14
Usage of 'shape2' at line 15
Declaration of 'shape3' at line 17
Usage of 'shape3' at line 18
```

- ∨ PACKAGE
  - > PackageDeclaration [0+17]
- ∨ IMPORTS (2)
  - > ImportDeclaration [21+37]
  - > ImportDeclaration [60+28]
- ∨ TYPES (1)
  - ∨ TypeDeclaration [92+352]
    - > > type binding: com.ppma.FactoryPatternDemo
    - JAVADOC: null
    - ∨ MODIFIERS (1)
      - > Modifier [92+6]
      - INTERFACE: 'false'
    - > NAME
    - TYPE_PARAMETERS (0)
    - SUPERCLASS_TYPE: null
    - SUPER_INTERFACE_TYPES (0)
    - PERMITS_TYPES (0)
    - ∨ BODY_DECLARATIONS (1)
      - ∨ MethodDeclaration [130+311]
        - > > method binding: FactoryPatternDemo.main(String[])
        - JAVADOC: null
        - ∨ MODIFIERS (2)

SYSTEM AND SOLUTION TO OBFUSCATE AND PREVENT THE PATTERN ANALYSIS OF JAVA ARCHIVES

FIELD

The field relates generally to obfuscating source code, and more particularly to obfuscating source code in Java archives in information processing systems.

BACKGROUND

Decompilers allow easy reverse engineering of source code. Once decompiled, code may be tampered with, and bundled again into an information processing system with the intent to misuse the reverse engineered code. Design pattern detection is often employed to understand the software implementation of the reverse engineered code (i.e., decompiled code).

SUMMARY

Illustrative embodiments provide techniques for implementing a design obfuscation system in a storage system. For example, illustrative embodiments provide a design obfuscation system that receives software code to be compiled on a system running a software compiler. The design obfuscation system generates obfuscated code from at least a portion of the software code, where the obfuscated code, when decompiled, avoids identification of design patterns in the software code. The design obfuscation system provides the obfuscated code to the software compiler for compiling and the software compiler compiles the obfuscated code. Other types of processing devices can be used in other embodiments. These and other illustrative embodiments include, without limitation, apparatus, systems, methods and processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a design obfuscation system, which technique may be used to provide, among other things generation of obfuscated code to avoid identification of design patterns in the software code. The design obfuscation system receives software code to be compiled on a system running a software compiler. The design obfuscation system generates obfuscated code from at least a portion of the software code, where the obfuscated code, when decompiled, avoids identification of design patterns in the software code. The design obfuscation system provides the obfuscated code to the software compiler for compiling and the software compiler compiles the obfuscated code. Other types of processing devices can be used in other embodiments.

Ensuring the security of the software code of various software programs can be a challenging task. For example, software programs may utilize code written in Java, which is provided to end-users in the form of one or more Java archives (e.g., a JAR or .jar package file format). Distributing such software programs may include providing such JAR files to end-users (e.g., bundled in a readable format providing code transparency).

Some groups or individuals may try to reverse engineer the code of software programs to exploit it for personal gain. Such groups or individuals may try to tamper with the software programs, bypass restrictions imposed by licenses for the software programs (e.g., to be able to use a given software program for an indefinite period of time rather than a definite or limited period of time specified by a license for the given software program, to gain unauthorized access to the given software program or features or functionality thereof, etc.), and combinations thereof. Reverse engineering of code can be done easily using available de-compilers. The decompiled code can be easily tampered with, and bundled again with an intent to misuse it.

To combat the above issues, at least a portion of the code of an application or software program may be obfuscated.

Conventional technologies that obfuscate software code do not obfuscate the design of the software code. Conventional technologies do not modify the software code such that it is impossible to read or understand the code functionality when the software code is decompiled. Conventional technologies do not provide software code obfuscation for storage and licensing in-house software solutions.

By contrast, in at least some implementations in accordance with the current technique as described herein, a design obfuscation system receives software code to be compiled on a system running a software compiler. The design obfuscation system generates obfuscated code from at least a portion of the software code, where the obfuscated code, when decompiled, avoids identification of design patterns in the software code. The design obfuscation system provides the obfuscated code to the software compiler for compiling and the software compiler compiles the obfuscated code.

Thus, a goal of the current technique is to provide a method and a system for providing a design obfuscation system that obfuscates the design patterns in the software code. Another goal is to achieve obfuscation using data modification and a design pattern modification algorithm. Another goal is to generate obfuscated code that cannot be understood if reverse engineered. Yet another goal is to provide a solution that is obfuscates the design patterns of Java archives (e.g., a JAR or .jar package file format) files.

In at least some implementations in accordance with the current technique described herein, the use of a design obfuscation system can provide one or more of the following advantages: providing a design obfuscation system that obfuscates the design patterns in the software code, generating obfuscated code that cannot be understood if reverse engineered, and providing a solution that is obfuscates the design patterns of Java archives (e.g., a JAR or .jar package file format) files.

In contrast to conventional technologies, in at least some implementations in accordance with the current technique as described herein, a design obfuscation system receives software code to be compiled on a system running a software compiler. The design obfuscation system generates obfuscated code from at least a portion of the software code, where the obfuscated code, when decompiled, avoids identification of design patterns in the software code. The design obfuscation system provides the obfuscated code to the software compiler for compiling and the software compiler compiles the obfuscated code.

In an example embodiment of the current technique, the design obfuscation system groups a plurality of obfuscated code according to group related classes.

In an example embodiment of the current technique, the design obfuscation system groups obfuscated Java source files according to respective packages.

In an example embodiment of the current technique, the portion of the software code comprises one or more archive files bundled with the portion of the software code.

In an example embodiment of the current technique, the one or more archive files comprise one or more Java archive files.

In an example embodiment of the current technique, a parser parses the software code to model the source code as a structured document.

In an example embodiment of the current technique, the design obfuscation system instantiates the parser to create an abstract syntax tree representing the software code.

In an example embodiment of the current technique, the design obfuscation system identifies design patterns in at least the portion of the software code.

In an example embodiment of the current technique, the design obfuscation system identifies at least one of a class, a method and a variable in at least the portion of the software code.

In an example embodiment of the current technique, the design obfuscation system determines that at least the portion of the software code comprises a hierarchy of classes and replaces the hierarchy of classes in the portion of the software code with a single class.

In an example embodiment of the current technique, the design obfuscation system instantiates in the single class, components in the hierarchy of classes that were identified by the parser, where the components are instantiated as obfuscated code.

In an example embodiment of the current technique, the design obfuscation system determines that at least the portion of the software code comprises at least one super class and replaces at least one super class in the portion of the software code with at least two classes.

In an example embodiment of the current technique, the design obfuscation system creates a compilation class and creates a package class that depends from the compilation class, where the package class declares replacement packages that will replace at least the portion of the software code with the obfuscated code and creates an import class that imports packages necessary to compile the replacement classes.

In an example embodiment of the current technique, the design obfuscation system declares at least one of a replacement class, replacement method and replacement variable that will replace at least the portion of the software code with the obfuscated code and groups at least one of the replacement class, replacement method and replacement variable according to a respective replacement package.

In an example embodiment of the current technique, the design obfuscation system compiles the obfuscated code with a Java compiler.

Figure 1:
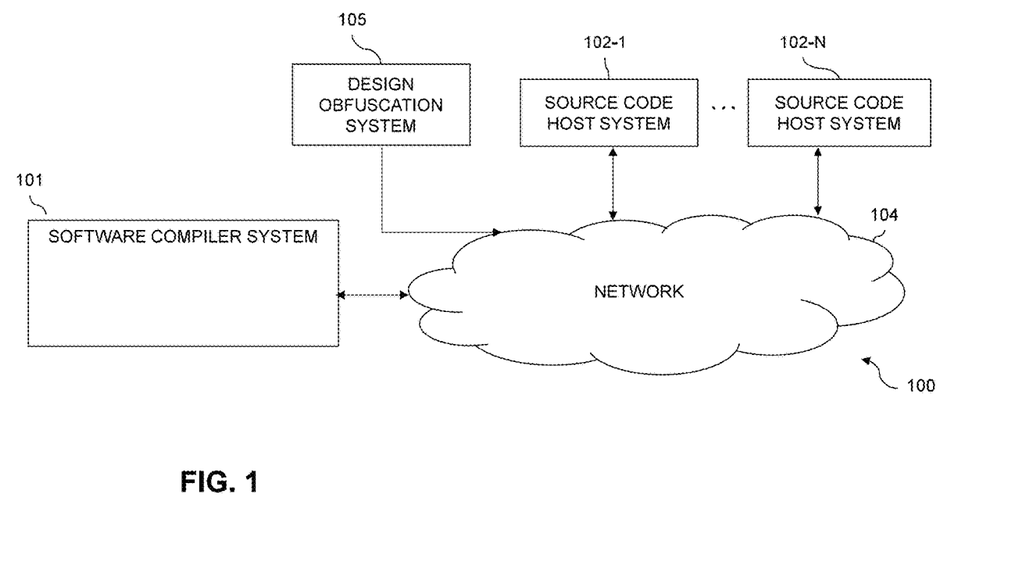
FIG. 1 shows an information processing system including a design obfuscation system in an illustrative embodiment.

FIG. 1 shows a computer network (also referred to herein as an information processing system) 100 configured in accordance with an illustrative embodiment. The computer network 100 comprises a software compiler system 101, design obfuscation system 105, and source code host systems 102-N. The software compiler system 101, design obfuscation system 105, and source code host systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a design obfuscation system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the source code host systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The source code host systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the design obfuscation system 105 are one or more input-output devices, which illustratively comprise keyboards, displays or other types of input-output devices in any combination. Such input-output devices can be used, for example, to support one or more user interfaces to the design obfuscation system 105, as well as to support communication between the design obfuscation system 105 and other related systems and devices not explicitly shown. For example, a dashboard may be provided for a user to view a progression of the execution of the design obfuscation system 105. One or more input-output devices may also be associated with any of the source code host systems 102-N.

Additionally, the design obfuscation system 105 in the FIG. 1 embodiment is assumed to be implemented using at least one processing device. Each such processing device generally comprises at least one processor and an associated memory, and implements one or more functional modules for controlling certain features of the design obfuscation system 105.

More particularly, the design obfuscation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the design obfuscation system 105 to communicate over the network 104 with the software compiler system 101, and source code host systems 102-N and illustratively comprises one or more conventional transceivers.

A design obfuscation system 105 may be implemented at least in part in the form of software that is stored in memory and executed by a processor, and may reside in any processing device. The design obfuscation system 105 may be a standalone plugin that may be included within a processing device.

It is to be understood that the particular set of elements shown in FIG. 1 for design obfuscation system 105 involving the software compiler system 101, and source code host systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the design obfuscation system 105 can be on and/or part of the same processing platform.

An exemplary process of design obfuscation system 105 in computer network 100 will be described in more detail with reference to, for example, the flow diagram of FIG. 2.

Figure 2:
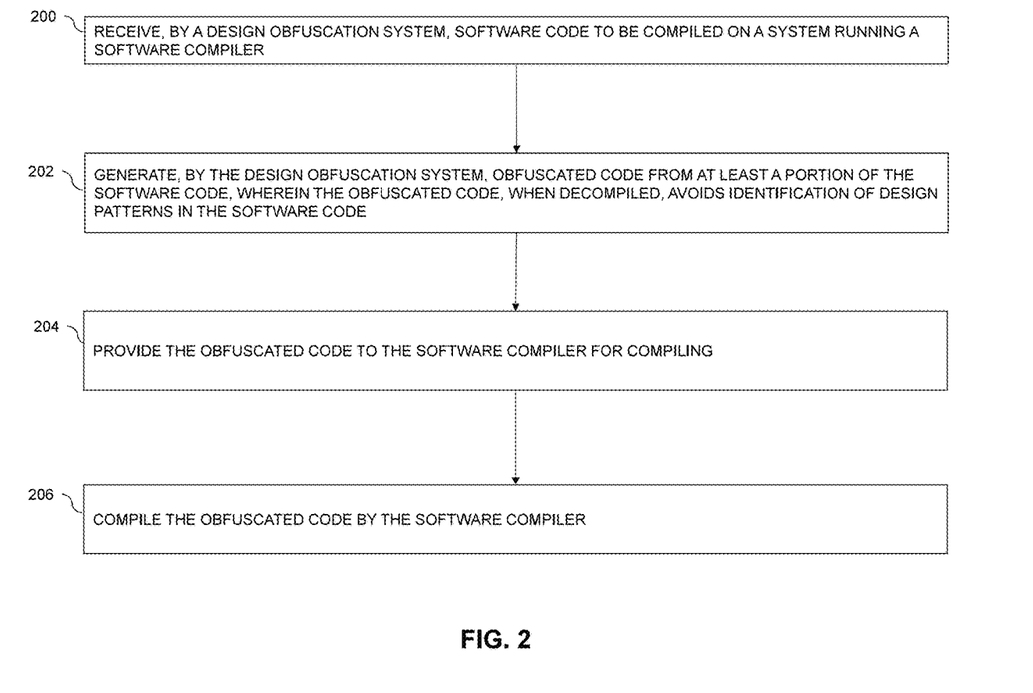
FIG. 2 shows a flow diagram of a process for a design obfuscation system in an illustrative embodiment.

FIG. 2 is a flow diagram of a process for execution of the design obfuscation system 105 in an illustrative embodiment. It is to be understood that this particular process is only an example, and additional or alternative processes can be carried out in other embodiments.

At 200, the design obfuscation system 105 receives software code to be compiled on a system running a software compiler. In an example embodiment, the software code is input to the design obfuscation system 105.

Figure 3:
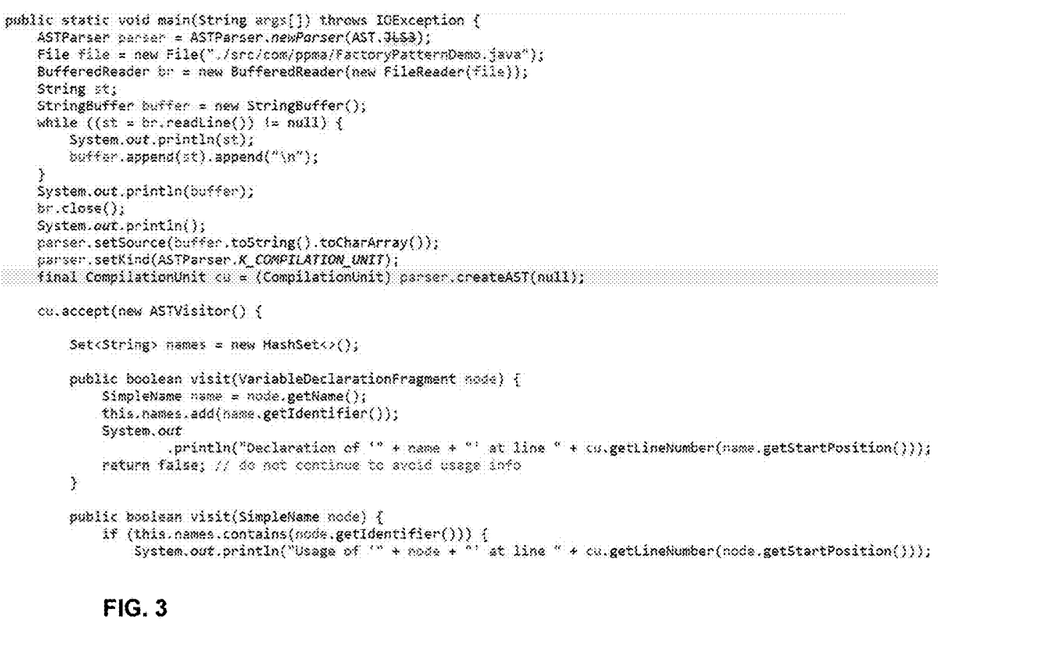
FIG. 3 illustrates a typical Package structure for Factory design pattern in an illustrative embodiment.

At 202 the design obfuscation system 105 generates obfuscated code from at least a portion of the software code. In an example embodiment, the design obfuscation system 105 identifies design patterns in the software code. The design obfuscation system 105 increases the security of the software code from being reverse engineered by obfuscating the design patterns of the software code. FIG. 3 illustrates a typical Package structure for Factory design pattern in an illustrative embodiment. The design obfuscation system 105 modifies the software code using design pattern obfuscation techniques. In an example embodiment, the design patterns of the software code may be obfuscated by coalescing classes into a single class, or splitting a super class into multiple entities. The obfuscated code, when decompiled, avoids identification of design patterns in the software code.

In an example embodiment, the software compiler system 101 is a Java compiler, and the design obfuscation system 105 is integrated with the source code host system, 102-N. In an example embodiment, at least the portion of the software code comprises one or more archive files bundled with the portion of the software code. In an example embodiment, the one or more archive files comprise one or more Java archive files. In an example embodiment, the one or more Java archive files are compiled and processed using the design obfuscation system 105 to produce the obfuscated code to obfuscate the design patterns in the software code to prevent their detection for reverse engineering.

Figure 4:
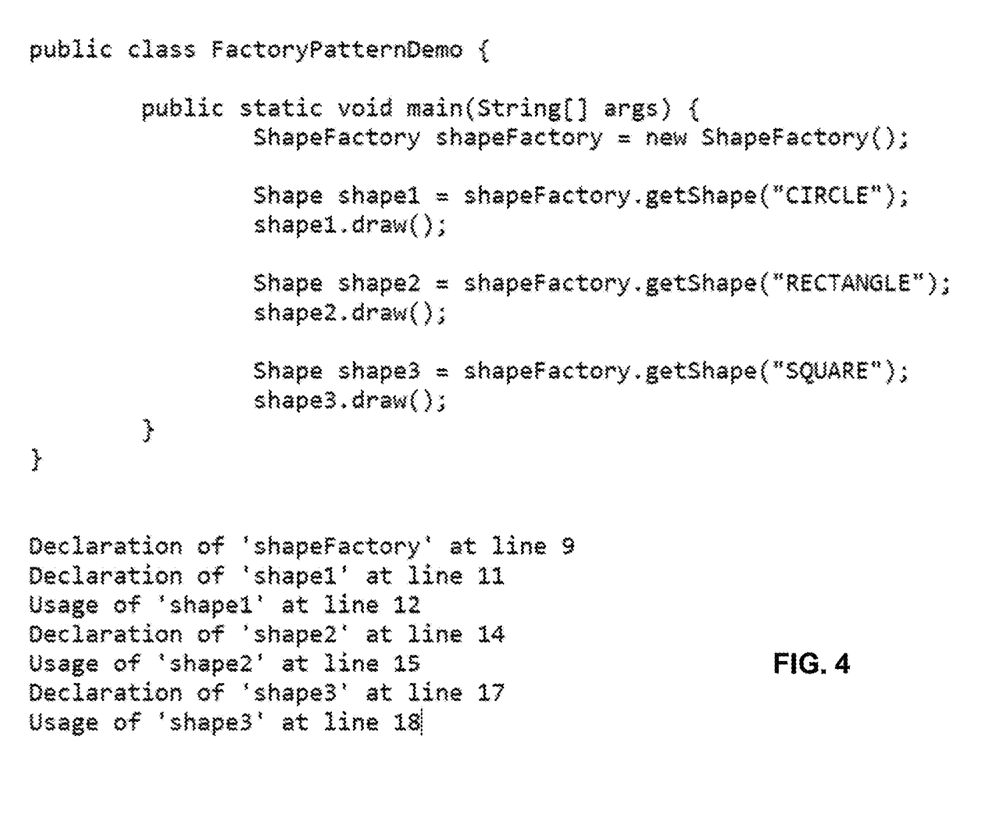
FIG. 4 illustrates an Abstract Syntax Tree parser that identifies the internal code structure of the software code in an illustrative embodiment.
Figure 5:
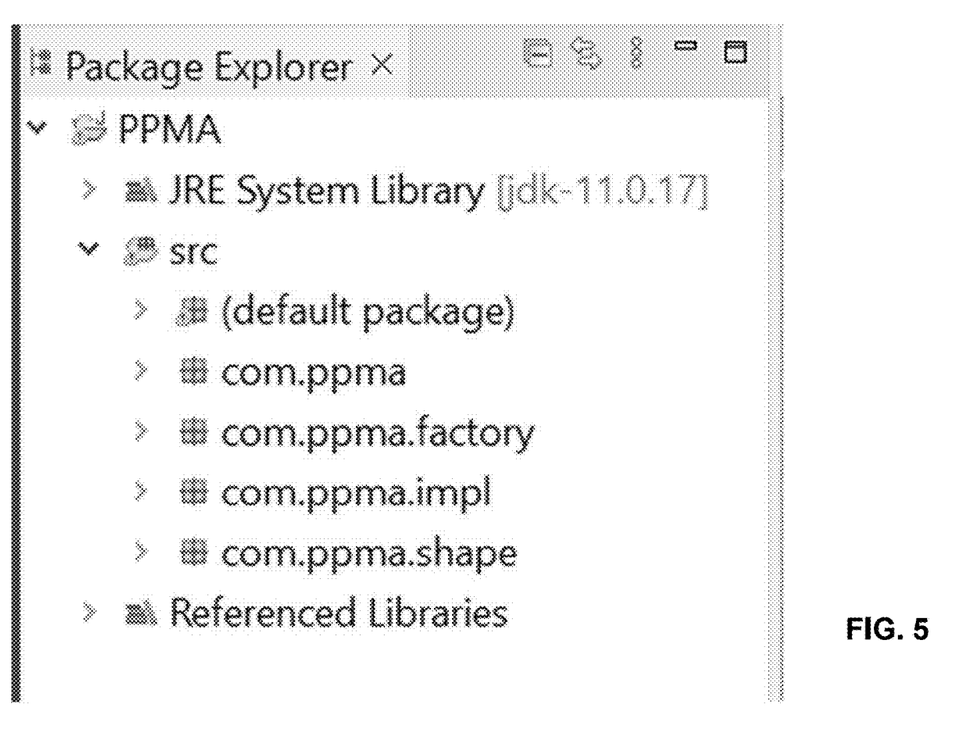
FIG. 5 illustrates an example console output of the Abstract Syntax Tree parser in an illustrative embodiment.
Figure 6:
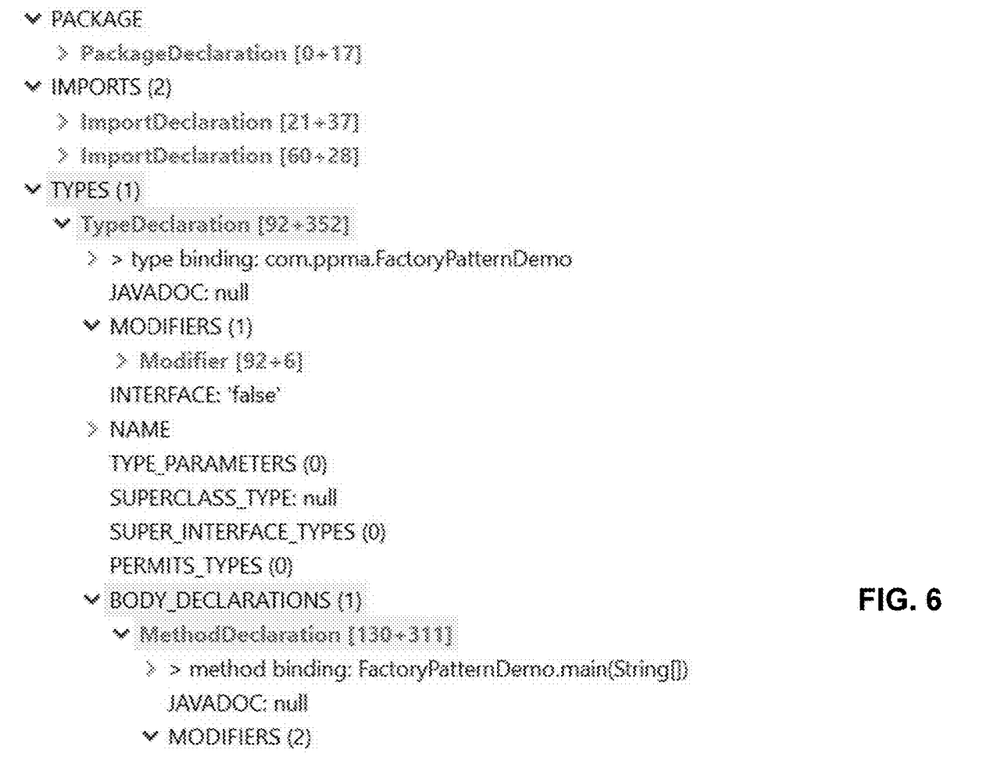
FIG. 6 illustrates an example tree representation of the abstract syntactic structure of the source code in workspace.

In an example embodiment, a parser parses the software code to model the source code as a structured document. In an example embodiment, the design obfuscation system 105 instantiates the parser to create an abstract syntax tree representing the software code. FIG. 4 illustrates an Abstract Syntax Tree parser that identifies the internal code structure of the software code in an illustrative embodiment. FIG. 5 illustrates an example console output of the Abstract Syntax Tree parser in an illustrative embodiment. FIG. 6 illustrates an example tree representation of the abstract syntactic structure of the source code in workspace.

In an example embodiment, the software code is Java source code. The design obfuscation system 105 instantiates a language parser for creating an abstract syntax tree (identified as "AST" in the code below) as it decodes the parameter of a language specification (identified as "JSL2" in the code below). The language parser code is listed below:

```
ASTParser parser = ASTParser.newParser(AST.JLS2);
parser.setSource(" ".toCharArray( ));
CompilationUnit unit = (CompilationUnit)parser.createAST(null);
```

-continued

```
unit.recordModifications( );
AST ast = unit.getAST( );
```

In an example embodiment, the design obfuscation system 105 creates a compilation class. The parser is used to create a CompilationUnit. The CompilationUnit contains elements that are required to be opened before they can be navigated or manipulated. These elements are listed below:

```
PackageDeclaration packageDeclare = ast.newPackageDeclaration( );
unit.setPackage(packageDeclare);
packageDeclare.setName(ast.newSimpleName(className));
```

In an example embodiment, the design obfuscation system 105 creates a package class that depends from the compilation class. The package class declares replacement packages that will replace at least the portion of the software code with the obfuscated code. In an example embodiment, the design obfuscation system 105 creates an import class that imports packages necessary to compile the replacement classes. The children of a CompilationUnit are a type of PackageDeclaration that declares Packages and an ImportDeclaration for importing necessary packages.

In an example embodiment, the design obfuscation system 105 declares at least one of a replacement class, replacement method and replacement variable that will replace at least the portion of the software code with the obfuscated code. In an example embodiment, the design obfuscation system 105 identifies design patterns in at least the portion of the software code. In an example embodiment, the design obfuscation system 105 identifies at least one of a class, a method and a variable in at least the portion of the software code. In an example embodiment, the design obfuscation system 105 groups at least one of the replacement class, replacement method and replacement variable according to a respective replacement package.

The TypeDeclaration and MethodDeclaration are classes used to define class and declare methods. A MethodDeclaration class contains methods such as setConstructor and setModifier to create methods as needed. These are illustrated in the code below:

```
TypeDeclaration classType = ast.newTypeDeclaration( );
classType.setInterface(false);
classType.setModifiers(Modifier.PUBLIC);
MethodDeclaration cp1Declaration = ast.newMethodDeclaration( );
cp1Declaration.setConstructor(false);
cp1Declaration.setModifiers(Modifier.PUBLIC);
```

The instance and local variables in a class are created using a VariableDeclarationFragment class applied to the CompilationUnit. A SingleVariableDeclaration is used to create parameters for the methods added to the class. These two classes are instantiated as illustrated below:

```
SingleVariableDeclaration svd = ast.newSingleVariableDeclaration( );
svd.setType(ast.newArrayType( ));
svd.setName(ast.newSimpleName("arguments"));
VariableDeclarationFragment vdf =
ast.newVariableDeclarationFragment( );
vdf.setName(ast.newSimpleName("ObfuscatedFactory"));
```

The child classes are added to a CompilationUnit and these statements are placed in the order they are added to the CompilationUnit. The classes taken from the package org.eclipse.jdt.core.dom are used to add different types of statements, such as assignments and method invocations.

In an example embodiment, the design obfuscation system 105 determines that at least the portion of the software code comprises a hierarchy of classes. In an example embodiment, the design obfuscation system 105 replaces the hierarchy of classes in the portion of the software code with a single class. In another example embodiment, the design obfuscation system 105 replaces the hierarchy of classes in the portion of the software with more than a single class, but a fewer number of classes than is in the hierarchy. For example, if there are 8 classes in the hierarchy of classes, the design obfuscation system 105 may replace the 8 classes with 7 or fewer classes, but at least 1 class.

In an example embodiment, the design obfuscation system 105 instantiates, in the single class, components in the hierarchy of classes that were identified by the parser, where the components are instantiated as obfuscated code. In the example below, the design obfuscation system 105 obfuscates the Factory Method pattern using class coalescing techniques. The design obfuscation system 105 removes the Factory interface, and its implementations, and includes functionality into the Client class using a separate createProduct method instantiated for all products. Listed below is the Client class:

```
public class Client {
    public static void main(String[ ] args) {
        Factory factory = new ConcreteFactory( );
        Product product = factory.factoryMethod( );
        product.printProductDesc( );
    }
}
```

Listed below is the Client class after the design obfuscation system 105 has obfuscated the software code:

```
public class ObfuscatedFactory {
    public Product createProduct1( ) {
        return new ConcreteProduct1( );
    }
    public Product createProduct2( ) {
        return new ConcreteProduct2( );
    }
    public static void main(String arg[ ]) {
        Product prod1 = factoryMethod.createProduct1( );
        prod1.printProductDesc( );
        Product prod2 = factoryMethod.createProduct2( );
        prod2.printProductDesc( );
    }
}
```

Before obfuscation, the Client class had Factory instantiation for creating Products. After the design obfuscation system 105 obfuscated the software code, there are individual methods for each Product, and these methods are used to create concrete products.

In an example embodiment, the design obfuscation system 105 creates obfuscated Java source files (that use patterns) using an Eclipse AST code to generate a Product class file. The design obfuscation system 105 places the obfuscated code under respective packages, and all source files are stored at a known location. These obfuscated code files are compiled using a Compiler class from an org.eclipse.jdt.internal package.

In an example embodiment, the design obfuscation system 105 determines that at least the portion of the software code comprises at least one super class. In an example embodiment, the design obfuscation system 105 replaces at least one super class in the portion of the software code with at least two classes.

At 204, the design obfuscation system 105 provides the obfuscated code to the software compiler for compiling.

At 206, the software compiler compiles the obfuscated code. In an example embodiment, a Java compiler compiles the obfuscated code.

In an example embodiment, the design obfuscation system 105 groups a plurality of obfuscated code according to group related classes. In an example embodiment, the design obfuscation system 105 groups obfuscated Java source files according to respective packages.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to obfuscate the design patterns of software code. These and other embodiments can effectively improve the security of storage and licensing in-house software solutions relative to conventional approaches.

Embodiments disclosed herein provide a design obfuscation system that obfuscates the design patterns in the software code. Embodiments herein generate obfuscated code that cannot be understood if reverse engineered. Embodiments herein provide a solution that is obfuscates the design patterns of Java archives (e.g., a JAR or .jar package file format) files.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of the information processing system 100, these platforms may also be used to implement at least portions of other information processing systems in other embodiments.

Figure 7:
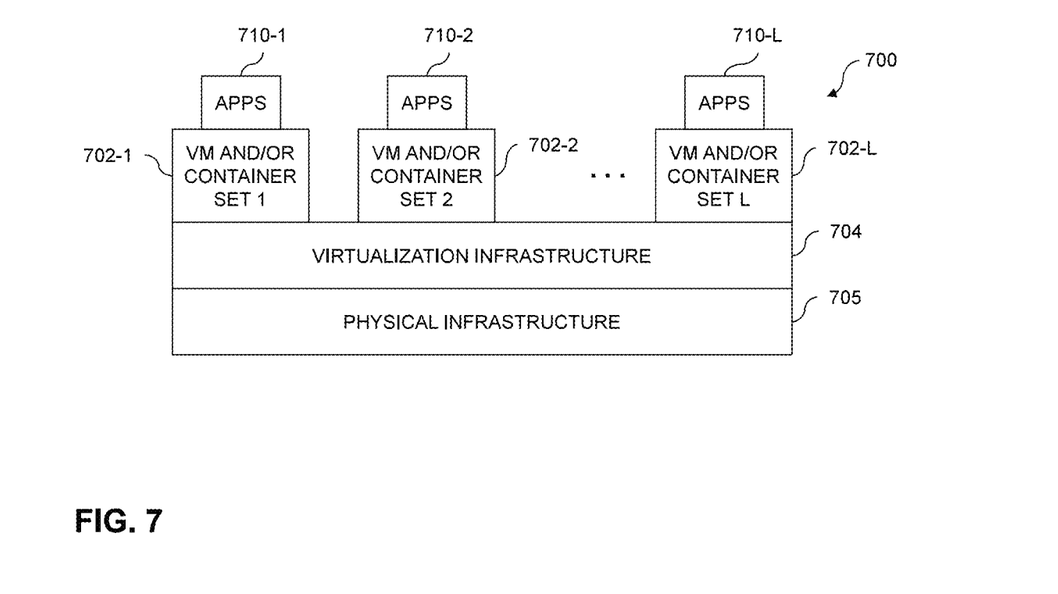
FIGS. 7 and 8 show examples of processing platforms that may be utilized to implement at least a portion of a design obfuscation system embodiments.
Figure 8:
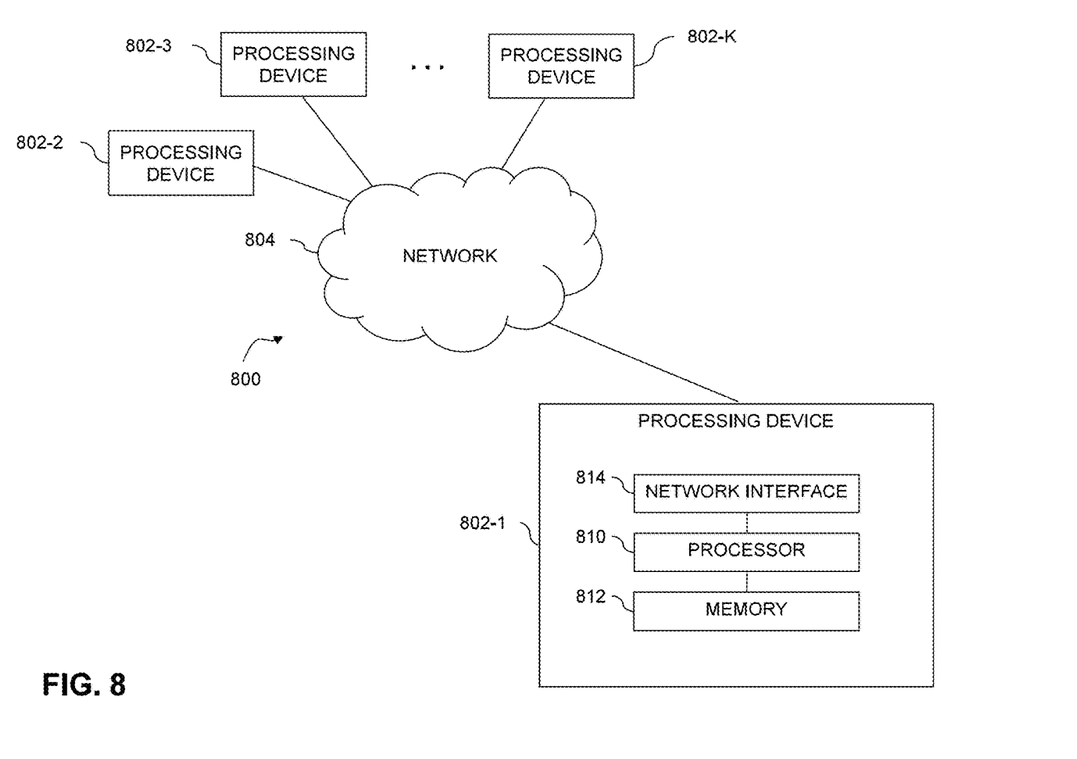

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, where the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of the information processing system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   receiving, by a design obfuscation system, software code to be compiled on a system running a software compiler;
   parsing, by the design obfuscation system, the software code using an abstract syntax tree parser to identify design patterns in the software code, wherein the design patterns comprise relationships between classes in a class hierarchy;
   generating, by the design obfuscation system, obfuscated code from at least a portion of the software code by:
   creating a compilation class;

creating a package class that depends from the compilation class;

declaring replacement packages in the package class that replace the identified design patterns with modified class structures; and creating an import class that imports packages necessary to compile the replacement packages;

wherein the obfuscated code, when decompiled, avoids identification of the design patterns in the software code;

providing the obfuscated code to the software compiler for compiling; and compiling the obfuscated code by the software compiler, wherein the method is performed by at least one processing device comprising a processor coupled to a memory.

2. The method of claim 1 further comprising:
grouping a plurality of obfuscated code according to group related classes.

3. The method of claim 2 wherein grouping the plurality of obfuscated code comprises:
grouping obfuscated Java source files according to respective packages.

4. The method of claim 1 wherein the portion of the software code comprises one or more archive files bundled with the portion of the software code.

5. The method of claim 4 wherein the one or more archive files comprise one or more Java archive files.

6. The method of claim 1 wherein generating, by the design obfuscation system, obfuscated code from at least the portion of the software code comprises:
parsing the software code by a parser, to model the source code as a structured document.

7. The method of claim 6 wherein parsing the portion of the software code by the parser comprises:
instantiating the parser to create an abstract syntax tree representing the software code.

8. The method of claim 1 wherein generating, by the design obfuscation system, obfuscated code from the at least the portion of the software code comprises:
identifying, by the design obfuscation system, the design patterns in the at least the portion of the software code.

9. The method of claim 8 wherein identifying, by the design obfuscation system the design patterns in the at least the portion of the software code comprises:
identifying at least one of a class, a method and a variable in the at least the portion of the software code.

10. The method of claim 8 wherein identifying, by the design obfuscation system the design patterns in the at least the portion of the software code comprises:
determining, by the design obfuscation system, that the at least the portion of the software code comprises a hierarchy of classes; and
replacing the hierarchy of classes in the portion of the software code with a single class.

11. The method of claim 10 wherein replacing the hierarchy of classes in the portion of the software code with the single class comprises:
instantiating, in the single class, components in the hierarchy of classes that were identified by the parser, where the components are instantiated as obfuscated code.

12. The method of claim 8 wherein identifying, by the design obfuscation system the design patterns in the at least the portion of the software code comprises:
determining, by the design obfuscation system, that the at least the portion of the software code comprises at least one super class; and
replacing the at least one super class in the portion of the software code with at least two classes.

13. The method of claim 1 wherein generating, by the design obfuscation system, obfuscated code from the at least the portion of the software code comprises:
utilizing a parser to create a CompilationUnit comprising elements that are required to be opened before they can be navigated or manipulated.

14. The method of claim 13 further comprising:
declaring at least one of a replacement class, replacement method and replacement variable that will replace the at least the portion of the software code with the obfuscated code; and
grouping the at least one of the replacement class, replacement method and replacement variable according to a respective replacement package.

15. The method of claim 1 wherein compiling the obfuscated code by the software compiler comprises:
compiling the obfuscated code with a Java compiler.

16. A system comprising:
at least one processing device comprising a processor coupled to a memory;
the at least one processing device being configured:
to receive, by a design obfuscation system, software code to be compiled on a system running a software compiler;
to parse, by the design obfuscation system, the software code using an abstract syntax tree parser to identify design patterns in the software code, wherein the design patterns comprise relationships between classes in a class hierarchy;
to generate, by the design obfuscation system, obfuscated code from at least a portion of the software code by:
creating a compilation class;
creating a package class that depends from the compilation class;
declaring replacement packages in the package class that replace the identified design patterns with modified class structures; and
creating an import class that imports packages necessary to compile the replacement packages;
wherein the obfuscated code, when decompiled, avoids identification of the design patterns in the software code;
to provide the obfuscated code to the software compiler for compiling; and
to compile the obfuscated code by the software compiler.

17. The system of claim 16 wherein the at least one processing device configured to generate, by the design obfuscation system, obfuscated code from at least the portion of the software code is further configured to:
parse the software code by a parser, to model the source code as a structured document.

18. The system of claim 17 wherein the at least one processing device configured to parse the portion of the software code by the parser is further configured to:
instantiate the parser to create an abstract syntax tree representing the software code.

19. The system of claim 16 wherein the at least one processing device configured to generate, by the design obfuscation system, obfuscated code from the at least the portion of the software code is further configured to:

identify, by the design obfuscation system, the design patterns in the at least the portion of the software code.

20. A computer program product comprising a non-transitory processor-readable storage medium having stored therein program code of one or more software programs, wherein the program code when executed by at least one processing device causes said at least one processing device:
- to receive, by a design obfuscation system, software code to be compiled on a system running a software compiler;
- to parse, by the design obfuscation system, the software code using an abstract syntax tree parser to identify design patterns in the software code, wherein the design patterns comprise relationships between classes in a class hierarchy;
- to generate, by the design obfuscation system, obfuscated code from at least a portion of the software code by:

creating a compilation class;

creating a package class that depends from the compilation class;

declaring replacement packages in the package class that replace the identified design patterns with modified class structures; and creating an import class that imports packages necessary to compile the replacement packages;

wherein the obfuscated code, when decompiled, avoids identification of the design patterns in the software code;
- to provide the obfuscated code to the software compiler for compiling; and
- to compile the obfuscated code by the software compiler.

* * * * *